(12) United States Patent
Nagata

(10) Patent No.: US 9,405,727 B2
(45) Date of Patent: Aug. 2, 2016

(54) DRIVING SUPPORT DEVICE, DRIVING SUPPORT METHOD, AND DRIVING SUPPORT PROGRAM

(75) Inventor: Shinichi Nagata, Yokohama (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/879,951

(22) PCT Filed: Feb. 23, 2011

(86) PCT No.: PCT/JP2011/053997
§ 371 (c)(1),
(2), (4) Date: Apr. 17, 2013

(87) PCT Pub. No.: WO2012/114478
PCT Pub. Date: Aug. 30, 2012

(65) Prior Publication Data
US 2013/0226445 A1    Aug. 29, 2013

(51) Int. Cl.
| | |
|---|---|
| *G05D 1/02* | (2006.01) |
| *G06F 17/00* | (2006.01) |
| *B60W 30/12* | (2006.01) |
| *B60W 30/14* | (2006.01) |
| *G08G 1/16* | (2006.01) |

(52) U.S. Cl.
CPC .............. *G06F 17/00* (2013.01); *B60W 30/12* (2013.01); *B60W 30/143* (2013.01); *G08G 1/167* (2013.01); *B60W 2550/14* (2013.01); *B60W 2550/141* (2013.01); *B60W 2550/306* (2013.01); *B60W 2550/402* (2013.01); *B60W 2720/10* (2013.01); *B60W 2720/103* (2013.01); *B60W 2750/306* (2013.01); *B60W 2750/308* (2013.01)

(58) Field of Classification Search
CPC . B60T 8/885; B60T 2270/416; B60T 13/662; G05B 9/02; B60C 23/0408
See application file for complete search history.

(56) References Cited

U.S. PATENT DOCUMENTS

| | | | | |
|---|---|---|---|---|
| 7,124,027 | B1 * | 10/2006 | Ernst, Jr. ............... | B60W 30/09 340/435 |
| 7,437,244 | B2 * | 10/2008 | Okada .................... | G08G 1/166 348/155 |
| 2001/0020201 | A1 * | 9/2001 | Shirai ................ | B60K 31/0066 701/1 |
| 2003/0109980 | A1 * | 6/2003 | Kojima .............. | B60K 31/0058 701/96 |

(Continued)

FOREIGN PATENT DOCUMENTS

| | | |
|---|---|---|
| CN | 101970273 A | 2/2011 |
| JP | 11-099955 A | 4/1999 |

(Continued)

*Primary Examiner* — Ian Jen
(74) *Attorney, Agent, or Firm* — Kenyon & Kenyon LLP

(57) ABSTRACT

A trajectory feature point generating unit of a driving support device determines a target speed of a host vehicle when the host vehicle passes the vicinity of an obstacle, on the basis of the maximum possible lateral distance of the host vehicle from the obstacle when the host vehicle passes the vicinity of the obstacle and a map in which a lateral distance and a speed when the host vehicle passes the vicinity of the obstacle are associated with each other. Therefore, for example, the trajectory feature point generating unit can determine the target speed of the host vehicle when the host vehicle passes the vicinity of the obstacle, in the range of the maximum possible distance from the obstacle, such that the speed is equal to or less than a value corresponding to a predetermined distance. As a result, it is possible to determine a state of the host vehicle which is consistent with reality.

19 Claims, 11 Drawing Sheets

(56) References Cited

U.S. PATENT DOCUMENTS

| | | | | |
|---|---|---|---|---|
| 2005/0004762 A1* | 1/2005 | Takahama | ............ | G01S 17/936 701/301 |
| 2006/0058931 A1* | 3/2006 | Ariyur | ............ | G05D 1/0257 701/23 |
| 2008/0243389 A1* | 10/2008 | Inoue | ............ | G08G 1/165 701/301 |
| 2009/0192710 A1* | 7/2009 | Eidehall | ............ | B62D 15/0265 701/301 |
| 2010/0208075 A1* | 8/2010 | Katsuno | ............ | B60Q 9/005 348/148 |
| 2010/0217527 A1* | 8/2010 | Hattori | ............ | B60T 7/22 701/301 |
| 2010/0253539 A1* | 10/2010 | Seder | ............ | G01S 13/723 340/903 |
| 2011/0010021 A1 | 1/2011 | Kobayashi | | |
| 2011/0029195 A1* | 2/2011 | Yamada | ............ | G01C 21/00 701/36 |
| 2011/0035129 A1* | 2/2011 | Yasui | ............ | B60T 8/17558 701/70 |
| 2011/0035150 A1* | 2/2011 | Sundarraj | ............ | G01S 5/0072 701/301 |
| 2013/0293395 A1 | 11/2013 | Ohama et al. | | |

FOREIGN PATENT DOCUMENTS

| | | |
|---|---|---|
| JP | 11-348598 A | 12/1999 |
| JP | 2007-148917 A | 6/2007 |
| JP | 2009-262702 A | 11/2009 |
| JP | 2010-036856 A | 2/2010 |
| JP | 2012-118741 A | 6/2012 |

* cited by examiner

DRIVING SUPPORT DEVICE, DRIVING SUPPORT METHOD, AND DRIVING SUPPORT PROGRAM

This is a 371 national phase application of PCT/JP2011/053997 filed 23 Feb. 2011, the contents of which are incorporated herein by reference.

The present invention relates to a driving support device, a driving support method, and a driving support program, and more particularly, to a driving support device, a driving support method, and a driving support program that determine the state of a host vehicle when the host vehicle passes the vicinity of an obstacle.

BACKGROUND ART

Devices that support the driving of the driver have been proposed. For example, Patent Literature 1 discloses a navigation device that acquires the driving tendency parameters of the driver and acquires the driving tendency parameters of a fellow passenger of the vehicle. The device disclosed in Patent Literature 1 calculates the difference between the driving tendency parameters of the driver and the driving tendency parameters of the fellow passenger and outputs information about the calculated difference as the traveling state of the vehicle to a display, thereby notifying the driver of the information. In this way, the device disclosed in Patent Literature 1 visually displays the difference between the driving tendency parameters of the driver and the driving tendency parameters of the fellow passenger as the traveling state of the vehicle such that the driver is aware of the difference. Therefore, the device disclosed in Patent Literature 1 is intended to provide a comfortable ride to the fellow passenger with driving experience.

CITATION LIST

Patent Literature

[Patent Literature 1] Japanese Unexamined Patent Application Publication No. 2007-148917

SUMMARY OF INVENTION

Technical Problem

However, the above-mentioned technique needs to be improved in order to determine a state of the host vehicle which is consistent with reality.

The invention has been made in view of the above-mentioned problem and an object of the invention is to provide a driving support device, a driving support method, and a driving support program capable of determining a state of the host vehicle which is consistent with reality.

Solution to Problem

According to an aspect of the invention, a driving support device includes a target determining unit that determines a target speed of a host vehicle when the host vehicle passes the vicinity of an obstacle, on the basis of a maximum possible distance of the host vehicle from the obstacle when the host vehicle passes the vicinity of the obstacle and a correspondence relationship between a distance between the host vehicle and the obstacle and a speed of the host vehicle when the host vehicle passes the vicinity of the obstacle.

According to this structure, the target speed of the host vehicle when the host vehicle passes the vicinity of an obstacle is determined on the basis of the maximum possible distance of the host vehicle from the obstacle when the host vehicle passes the vicinity of the obstacle and the correspondence relationship between the distance between the host vehicle and the obstacle and the speed of the host vehicle when the host vehicle passes the vicinity of the obstacle. Therefore, for example, the target determining unit can determine the target speed of the host vehicle when the host vehicle passes the vicinity of the obstacle in the range of the maximum possible distance from the obstacle such that it is equal to or less than the speed corresponding to a predetermined distance. Therefore, it is possible to determine a state of the host vehicle which is consistent with reality.

In this case, the target determining unit may determine a target distance between the host vehicle and the obstacle when the host vehicle passes the vicinity of the obstacle, in the range of the maximum possible distance of the host vehicle from the obstacle when the host vehicle passes the vicinity of the obstacle.

According to this structure, the target determining unit determines the target distance between the host vehicle and the obstacle when the host vehicle passes the vicinity of the obstacle, in the range of the maximum possible distance of the host vehicle from the obstacle when the host vehicle passes the vicinity of the obstacle. In this way, the target determining unit can determine the target distance in the range of the maximum possible distance from the obstacle and determine the target speed so as to be equal to or less than the speed corresponding to the determined target distance. Therefore, it is possible to determine a state of the host vehicle which is consistent with reality.

The target determining unit may determine a distance between the host vehicle and the obstacle when the host vehicle passes the vicinity of the obstacle, which is estimated on the basis of the current traveling state of the host vehicle, to be the target distance. The target determining unit may determine a speed equal to or less than the speed corresponding to the determined target distance to be the target speed in the correspondence relationship between the distance between the host vehicle and the obstacle and the speed of the host vehicle when the host vehicle passes the vicinity of the obstacle.

According to this structure, the target determining unit determines a distance between the host vehicle and the obstacle when the host vehicle passes the vicinity of the obstacle, which is estimated on the basis of the current traveling state of the host vehicle, to be the target distance. The target determining unit determines the speed corresponding to the determined target distance to be the target speed in the correspondence relationship between the distance between the host vehicle and the obstacle and the speed of the host vehicle when the host vehicle passes the vicinity of the obstacle. Therefore, the target determining unit can determine the target distance when the current traveling state of the host vehicle is maintained and intervention in the driving operation of the driver of the host vehicle in the lateral direction is minimized and determine the target speed corresponding to the target distance. As a result, it is possible to prevent the driver from feeling a sense of incongruity. In the invention, the "traveling state" of the host vehicle includes the speed, yaw angle, yaw rate, lateral acceleration, and longitudinal acceleration of the host vehicle, the lateral distance between another vehicle and the host vehicle, and the operation state quantity of the driver.

The target determining unit may determine a distance between the host vehicle and the obstacle and the speed of the host vehicle, which satisfy the correspondence relationship between the distance between the host vehicle and the obstacle and the speed of the host vehicle when the host vehicle passes the vicinity of the obstacle and are evaluated to be attained from the current traveling state of the host vehicle using a minimum change in the traveling state, to be the target distance and the target speed.

According to this structure, the target determining unit determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and are evaluated to be attained from the current traveling state of the host vehicle by a minimum change in the traveling state, to be the target distance and the target speed. Therefore, it is possible to determine the target distance and the target speed which can be attained by a minimum change in the traveling state. As a result, it is possible to reduce the disturbance of the host vehicle when driving support is performed.

When the host vehicle is accelerated, the target determining unit may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed. When the host vehicle is steered such that the distance from the obstacle is reduced, the target determining unit may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by braking only, to be the target distance and the target speed. When the host vehicle is steered such that the distance from the obstacle increases, the target determining unit may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed.

According to this structure, when the host vehicle is accelerated, the target determining unit determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed. When the host vehicle is steered such that the distance from the obstacle is reduced, the target determining unit determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by braking only, to be the target distance and the target speed. When the host vehicle is steered such that the distance from the obstacle increases, the target determining unit determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed. Therefore, using a simple process, it is possible to determine the target distance and the target speed at which intervention in the driving operation of the driver is reduced. As a result, it is possible to prevent the driver from feeling a sense of incongruity with a simple process.

The target determining unit may determine the target distance between the host vehicle and the obstacle and the target speed of the host vehicle when the host vehicle passes through a reference line which is set in the vicinity of the obstacle. The reference line may be set so as to pass through a point that is closer to the current position of the host vehicle as the distance from the obstacle increases.

According to this structure, the target determining unit determines the target distance between the host vehicle and the obstacle and the target speed of the host vehicle when the host vehicle passes through the reference line which is set in the vicinity of the obstacle. The reference line is set so as to pass through a point that is closer to the current position of the host vehicle as the distance from the obstacle increases. Therefore, as the distance from the obstacle increases and it is easier to ensure visibility of the blind spot caused by the obstacle, the target distance and the target speed are determined earlier at a point which is closer to the current position of the host vehicle. As a result, it is possible to determine a state of the host vehicle which is consistent with reality and the senses of the driver.

According to another aspect of the invention, a driving support device includes a storage unit that stores a relationship between a distance between a host vehicle and an obstacle and a speed of the host vehicle when the host vehicle passes the vicinity of the obstacle, a maximum distance calculating unit that calculates a maximum possible distance of the host vehicle from the obstacle when the host vehicle passes the vicinity of the obstacle, and a target determining unit that determines a target speed of the host vehicle when the host vehicle passes the vicinity of the obstacle, on the basis of the relationship stored in the storage unit and the maximum possible distance calculated by the maximum distance calculating unit.

According to still another aspect of the invention, a driving support method includes a target determining step of determining a target speed of a host vehicle when the host vehicle passes the vicinity of an obstacle, on the basis of a maximum possible distance of the host vehicle from the obstacle when the host vehicle passes the vicinity of the obstacle and a correspondence relationship between a distance between the host vehicle and the obstacle and a speed of the host vehicle when the host vehicle passes the vicinity of the obstacle.

In this case, the target determining step may determine a target distance between the host vehicle and the obstacle when the host vehicle passes the vicinity of the obstacle, in the range of the maximum possible distance of the host vehicle from the obstacle when the host vehicle passes the vicinity of the obstacle.

The target determining step may determine the distance between the host vehicle and the obstacle when the host vehicle passes the vicinity of the obstacle, which is estimated on the basis of the current traveling state of the host vehicle, to be the target distance. The target determining step may determine a speed equal to or less than the speed corresponding to the determined target distance to be the target speed in the correspondence relationship between the distance between the host vehicle and the obstacle and the speed of the host vehicle when the host vehicle passes the vicinity of the obstacle.

The target determining step may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and are evaluated to be attained from the current traveling state of the host vehicle by a minimum change in the traveling state, to be the target distance and the target speed.

When the host vehicle is accelerated, the target determining step may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed. When the host vehicle is steered such that the distance from the obstacle is reduced, the target determining step may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by braking only, to be the target distance and the target speed. When the host vehicle is steered such that the distance from the obstacle increases, the target determining step may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed.

The target determining step may determine the target distance between the host vehicle and the obstacle and the target speed of the host vehicle when the host vehicle passes through a reference line which is set in the vicinity of the obstacle. The reference line may be set so as to pass through a point that is closer to the current position of the host vehicle as the distance from the obstacle increases.

According to yet another aspect of the invention, there is provided a driving support program that allows an electronic computer to perform a target determining step of determining a target speed of a host vehicle when the host vehicle passes the vicinity of an obstacle, on the basis of a maximum possible distance of the host vehicle from the obstacle when the host vehicle passes the vicinity of the obstacle and a correspondence relationship between a distance between the host vehicle and the obstacle and a speed of the host vehicle when the host vehicle passes the vicinity of the obstacle.

In this case, the target determining step may determine a target distance between the host vehicle and the obstacle when the host vehicle passes the vicinity of the obstacle, in the range of the maximum possible distance of the host vehicle from the obstacle when the host vehicle passes the vicinity of the obstacle.

The target determining step may determine the distance between the host vehicle and the obstacle when the host vehicle passes the vicinity of the obstacle, which is estimated on the basis of the current traveling state of the host vehicle, to be the target distance. The target determining step may determine a speed equal to or less than the speed corresponding to the determined target distance to be the target speed in the correspondence relationship between the distance between the host vehicle and the obstacle and the speed of the host vehicle when the host vehicle passes the vicinity of the obstacle.

The target determining step may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and are evaluated to be attained from the current traveling state of the host vehicle by a minimum change in the traveling state, to be the target distance and the target speed.

When the host vehicle is accelerated, the target determining step may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed. When the host vehicle is steered such that the distance from the obstacle is reduced, the target determining step may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by braking only, to be the target distance and the target speed. When the host vehicle is steered such that the distance from the obstacle increases, the target determining step may determine the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed.

The target determining step may determine the target distance between the host vehicle and the obstacle and the target speed of the host vehicle when the host vehicle passes through a reference line which is set in the vicinity of the obstacle. The reference line may be set so as to pass through a point that is closer to the current position of the host vehicle as the distance from the obstacle increases.

Advantageous Effects of Invention

According to the driving support device, the driving support method, and the driving support program, it is possible to determine a state of the host vehicle which is consistent with reality.

DESCRIPTION OF EMBODIMENTS

Figure 1:
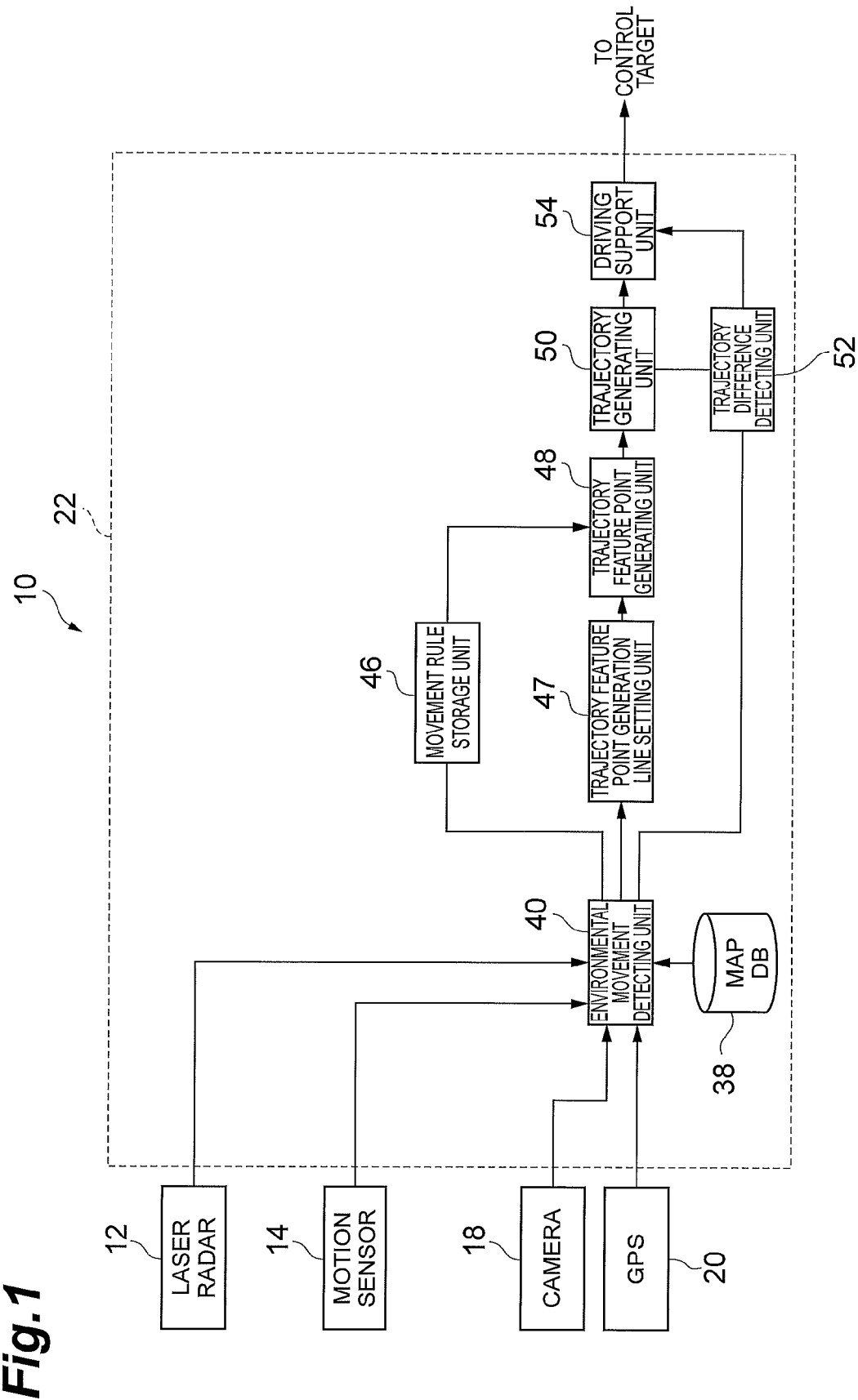
FIG. 1 is a block diagram illustrating the structure of a driving support device according to a first embodiment.

A driving support device according to an embodiment of the invention will be described with reference to the accompanying drawings. As shown in FIG. 1, a driving support device 10 according to a first embodiment of the invention includes a laser radar 12, a motion sensor 14, a camera 18, a GPS 20, and a computer 22.

The laser radar 12 emits laser beams to the front side of a host vehicle while performing scanning in the horizontal direction and detects the position of an object irradiated with the laser beams using the reflection of the laser beams. The detection process using the laser radar 12 is performed at a predetermined cycle. The detection result of the laser radar 12 is output to the computer 22.

The motion sensor 14 is a device that measures the speed of the host vehicle, the acceleration thereof in the traveling direction, the acceleration thereof in the lateral direction, and the yaw angle and yaw rate thereof. The motion sensor 14 includes a vehicle speed sensor that measures the speed of the host vehicle, a white line sensor that measures the yaw angle of the host vehicle, a gyro sensor that measures the yaw rate, and an acceleration sensor that measures the acceleration of the host vehicle.

The camera 18 is a device that captures the front of the host vehicle. The camera 18 is a small CCD camera or CMOS camera. For example, the road conditions in front of the host vehicle which are captured by the camera 18 are output to the computer 22.

The GPS (Global Positioning System) 20 is a device that receives signals from a plurality of GPS satellites using a GPS receiver and measures the position of the host vehicle from the difference between the signals.

The computer 22 includes a CPU, a ROM that stores a driving support program for performing a driving support method, which will be described below, a RAM, and a bus. When the computer 22 is divided into blocks corresponding to functions, the computer 22 includes a map DB 38, an environmental motion detecting unit 40, a movement rule storage unit 46, a trajectory feature point generation line setting unit 47, a trajectory feature point generating unit 48, a trajectory generating unit 50, a trajectory difference detecting unit 52, and a driving support unit 54.

The map DB 38 stores information about road width, road shape, traffic signs and marks, and buildings.

The environmental motion detecting unit 40 detects the position of the host vehicle, the traveling state of the host vehicle, obstacles in the vicinity of the host vehicle, and the environment surrounding the host vehicle, on the basis of the information acquired by the laser radar 12, the motion sensor 14, the camera 18, and the GPS 20. In particular, the environmental motion detecting unit 40 calculates the traveling range of the host vehicle on the basis of the information stored in the map DB 38, which will be described below.

Figure 3:
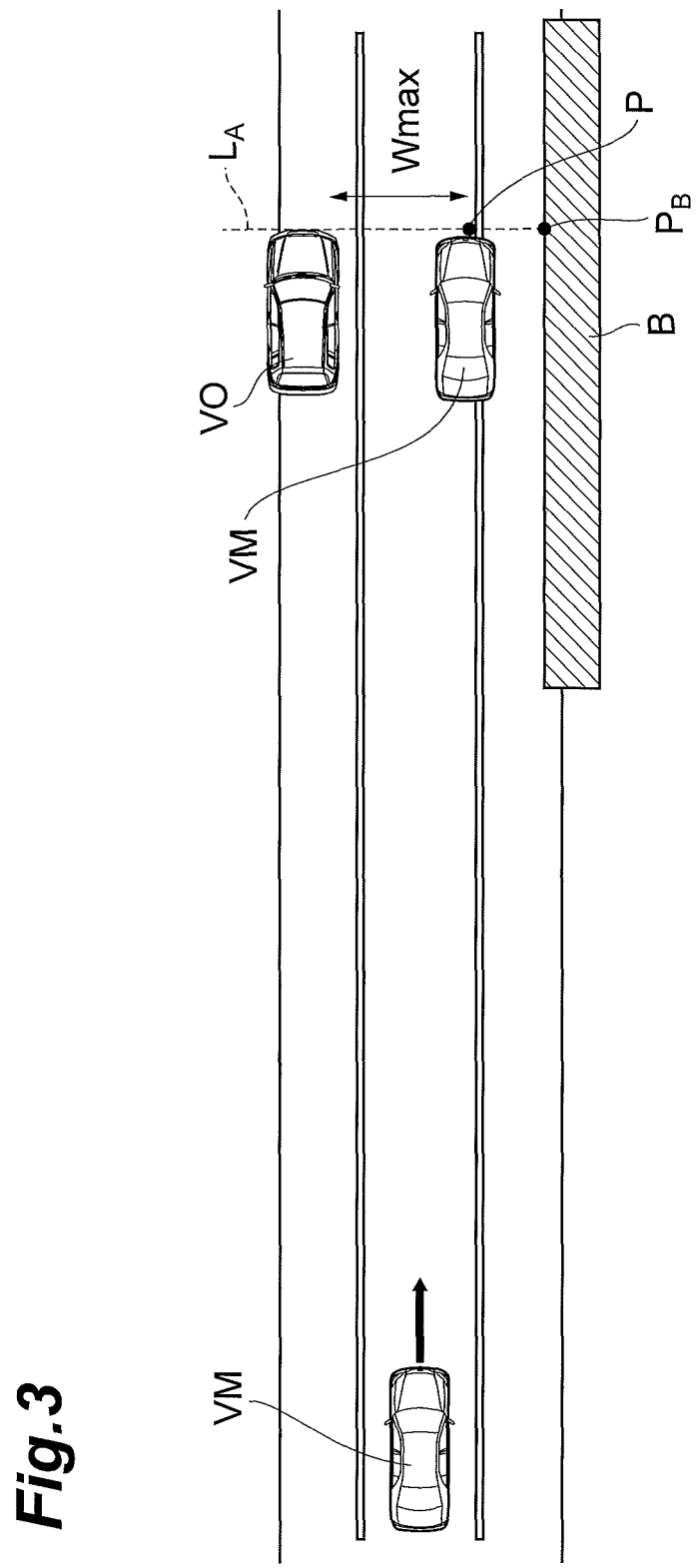
FIG. 3 is a plan view illustrating a situation in which the host vehicle passes through a reference line extending from the side of the vehicle in front in the first embodiment.
Figure 7:
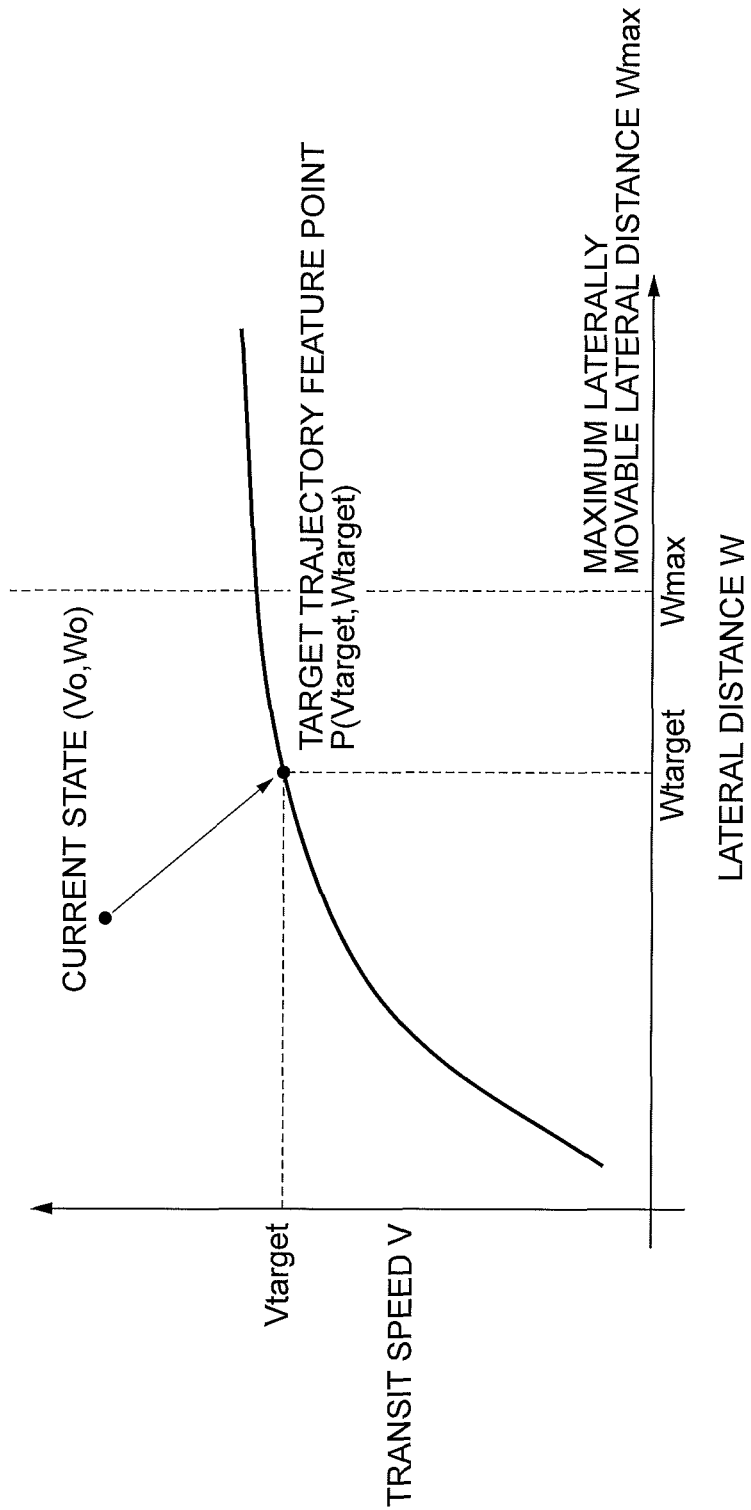
FIG. 7 is a graph illustrating a method of calculating the target trajectory feature point P (Vtarget, Wtarget) in the range of the maximum laterally movable lateral distance Wmax in the first embodiment.

For example, as represented by a curved line in FIG. 3 or FIG. 7, when a skilled and exemplary driver drives the vehicle according to each situation, the correspondence relationship between the lateral distance W between the host vehicle and an obstacle when the host vehicle passes the vicinity of the obstacle and the transit speed V of the host vehicle is stored as a map.

The trajectory feature point generation line setting unit 47 sets a trajectory feature point generation line, which is a reference line that is set in the vicinity of the obstacle in order to generate a target trajectory feature point P (the transit speed V, the lateral distance W) satisfying the conditions of the map stored in the movement rule storage unit 46, which will be described below.

The trajectory feature point generating unit 48 generates the target trajectory feature point P (the transit speed V, the lateral distance W) satisfying the conditions of the map stored in the movement rule storage unit 46, which will be described.

The trajectory generating unit 50 generates a trajectory from the current position of the host vehicle to the target trajectory feature point P. The trajectory difference detecting unit 52 detects the difference between the trajectory generated by the trajectory generating unit 50 and the actual trajectory of the host vehicle detected by the environmental motion detecting unit 40. The driving support unit 54 supports the driving of the driver of the host vehicle on the basis of the trajectory generated by the trajectory generating unit 50 and the difference detected by the trajectory difference detecting unit 52. Specifically, the driving support unit 54 guides the driving of the driver of the vehicle using images or sounds. In addition, the driving support unit 54 gives reaction force to a steering wheel, an accelerator pedal, and a brake pedal using actuators, thereby guiding the driving of the driver of the vehicle. Furthermore, the driving support unit 54 controls the speed, acceleration, deceleration, and steering angle of the host vehicle, regardless of the driving operation of the driver.

Figure 4:
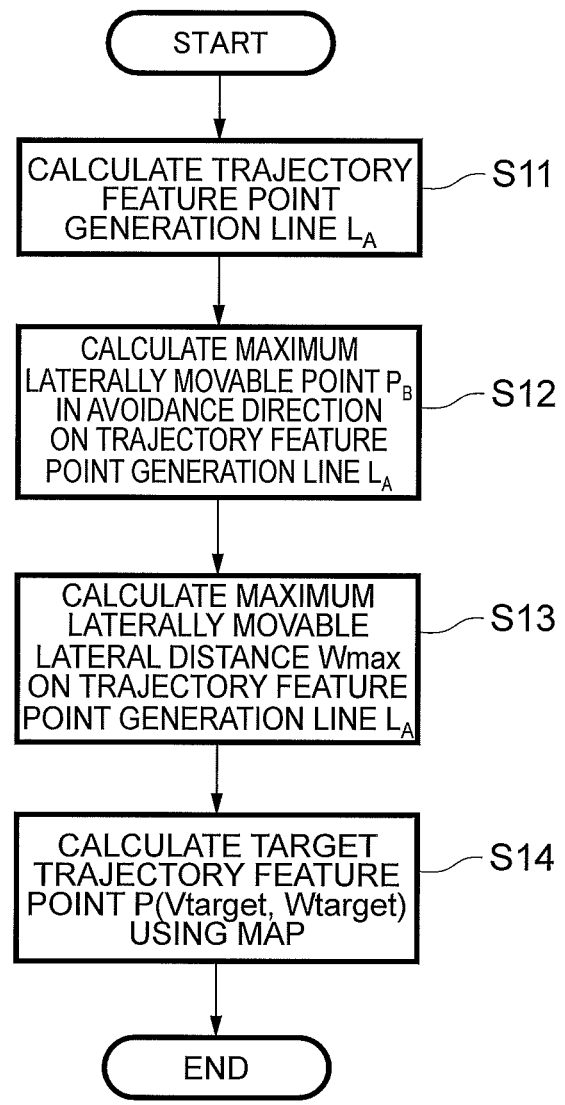
FIG. 4 is a flowchart illustrating a process of calculating the target trajectory feature point in the first embodiment.

Next, the operation of the driving support device 10 according to this embodiment will be described. In the following description, a situation in which a host vehicle VM passes by another vehicle VO is assumed as shown in FIG. 3. As shown in FIG. 4, the trajectory feature point generation line setting unit 47 sets a trajectory feature point generation line $L_A$ from information about the host vehicle VM or another vehicle VO which is detected by the environmental motion detecting unit 40 (S11). As shown in FIG. 3, in this embodiment, the trajectory feature point generation line setting unit 47 sets the trajectory feature point generation line $L_A$ from the leading end of another vehicle VO in a direction intersecting the lane of the road.

The trajectory feature point generating unit 48 calculates the maximum laterally movable point $P_B$ in the avoidance direction (the direction in which the host vehicle is separated from another vehicle VO) of another vehicle VO on the trajectory feature point generation line $L_A$ (S12). In the example shown in FIG. 3, since the side end of the road is blocked by a barrier B, the maximum laterally movable point $P_B$ is calculated on the surface of the barrier B on the trajectory feature point generation line $L_A$. The maximum laterally movable point $P_B$ can be calculated on the basis of information about the position of the barrier B or an oncoming vehicle which is calculated by the laser radar 12 or the camera 18 or information about the traffic regulations, such as the white line and yellow line of the road, or a no-entry sign.

The trajectory feature point generating unit 48 calculates the maximum possible lateral distance Wmax of the host vehicle VM in the lateral direction on the trajectory feature point generation line $L_A$ (S13). The lateral distance Wmax is, for example, a distance obtained by subtracting a predetermined margin from another vehicle VO and the maximum laterally movable point $P_B$.

Figure 2:
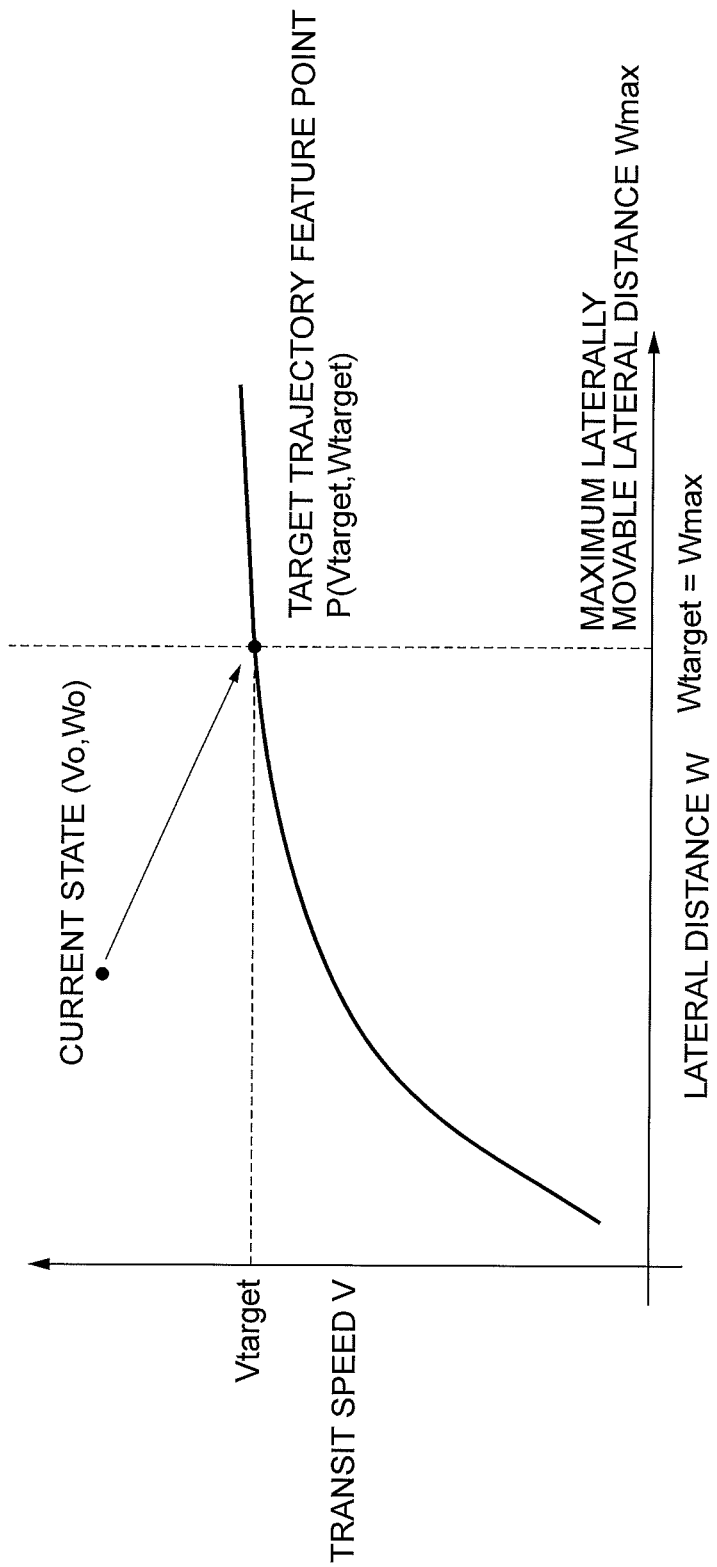
FIG. 2 is a graph illustrating a method of calculating a target trajectory feature point P (Vtarget, Wtarget) using the maximum laterally movable lateral distance Wmax in the first embodiment.

The trajectory feature point generating unit 48 calculates the target trajectory feature point P (Vtarget, Wtarget) using the map shown in FIG. 2 (S14). In the example shown in FIG. 2, Wtarget=Wmax is established and the host vehicle VM passes through a point that is away from another vehicle VO by the maximum lateral distance Wmax. The host vehicle VM passes by another vehicle VO at a target speed Vtarget corresponding to Wtarget=Wmax on the curved line shown in FIG. 2. In this case, the deceleration of the host vehicle VM is minimized and the host vehicle VM can pass by another vehicle VO in the shortest time.

In the invention, Wtarget may be equal to or less than Wmax. In the invention, Vtarget is not necessarily set on the curve line of the map, but may be set to a speed that is equal to or less than Vtarget and corresponds to Wtarget on the curve line of the map. The trajectory generating unit 50 generates a trajectory which is closest to the target trajectory feature point P (Vtarget, Wtarget) from the current state (Vo, Wo) of the host vehicle VM.

Next, the calculation of the target trajectory feature point P (Vtarget, Wtarget) will be described in detail. In this embodiment, a future position of the host vehicle VM is estimated using the quantity of state of the host vehicle VM and the operation of the driver. In this embodiment, among the target trajectory feature points P which can be acquired on the map, an estimated point through which the host vehicle VM will pass in the future is set as the target trajectory feature point P.

Figure 5:
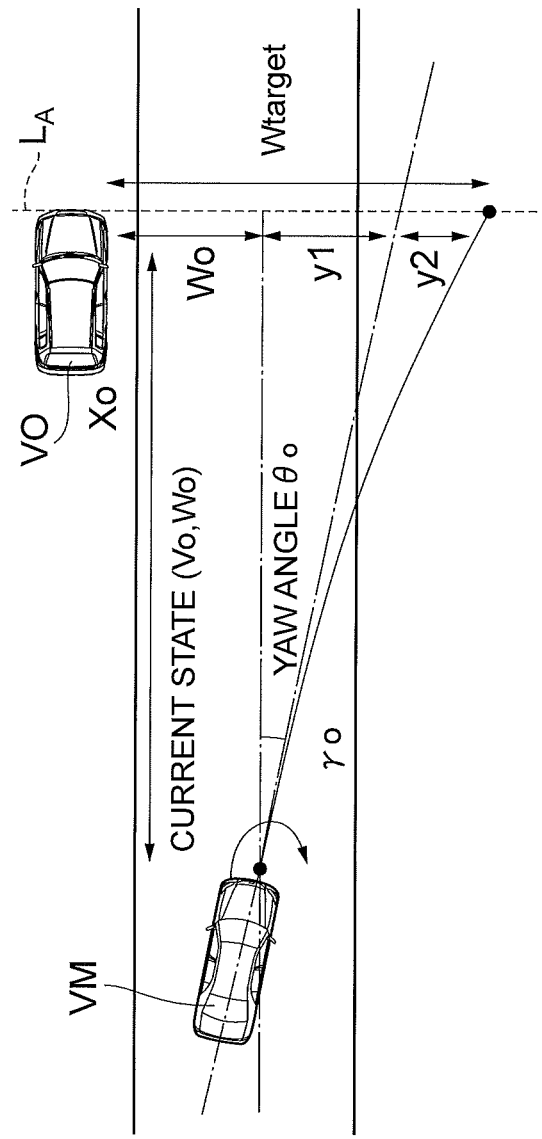
FIG. 5 is a plan view illustrating a method of calculating the target lateral distance Wtarget in the first embodiment.

As shown in FIG. 5, it is assumed that, when the distance to the trajectory feature point generation line $L_A$ is Xo, the current quantities of state of the host vehicle VM include the speed Vo of the host vehicle VM, the lateral distance Wo between the host vehicle VM and another vehicle VO, a yaw angle θo, and yaw rate γo. The trajectory feature point generating unit 48 calculates a lateral movement amount y1 corresponding to the yaw angle and a lateral movement amount y2 corresponding to the yaw rate from lateral acceleration ao, the yaw angle θo, and the yaw rate γo which are the current quantities of state of the host vehicle VM (S21). Here, the lateral acceleration ao is approximately equal to Vo×γo, the arrival time To to the trajectory feature point is approximately equal to Xo÷Vo, the lateral movement amount y2 corresponding to the yaw rate is approximately equal to ½× ao×To², and the lateral movement amount y1 corresponding to the yaw angle is equal to Xo×tan θo.

When any one of ao, θo, γo, and the longitudinal acceleration αo of the host vehicle VM is equal to or greater than a predetermined threshold value (S22), it is considered that the driver of the host vehicle VM performs a driving operation in order to avoid another vehicle VO. The trajectory feature point generating unit 48 calculates a target lateral distance Wtarget on the trajectory feature point generation line $L_A$ which is estimated from the current quantity of state of the host vehicle VM (S23) (where Wtarget=Wo+y1+y2 is established).

When |Wtarget|>|Wmax| is satisfied, that is, when the target lateral distance Wtarget calculated from the current quantity of state of the host vehicle VM is more than Wmax (S24), the trajectory feature point generating unit 48 sets the target lateral distance Wtarget to be equal to Wmax, as shown in FIG. 2 (S25). When |Wtarget|>|Wmax| is not satisfied (S24), the trajectory feature point generating unit 48 sets the target lateral distance Wtarget calculated from the current quantity of state of the host vehicle VM, as shown in FIG. 7. The trajectory feature point generating unit 48 sets the target speed Vtarget of the host vehicle VM which corresponds to Wtarget on the curved line shown in FIG. 2 or FIG. 7.

Figure 6:
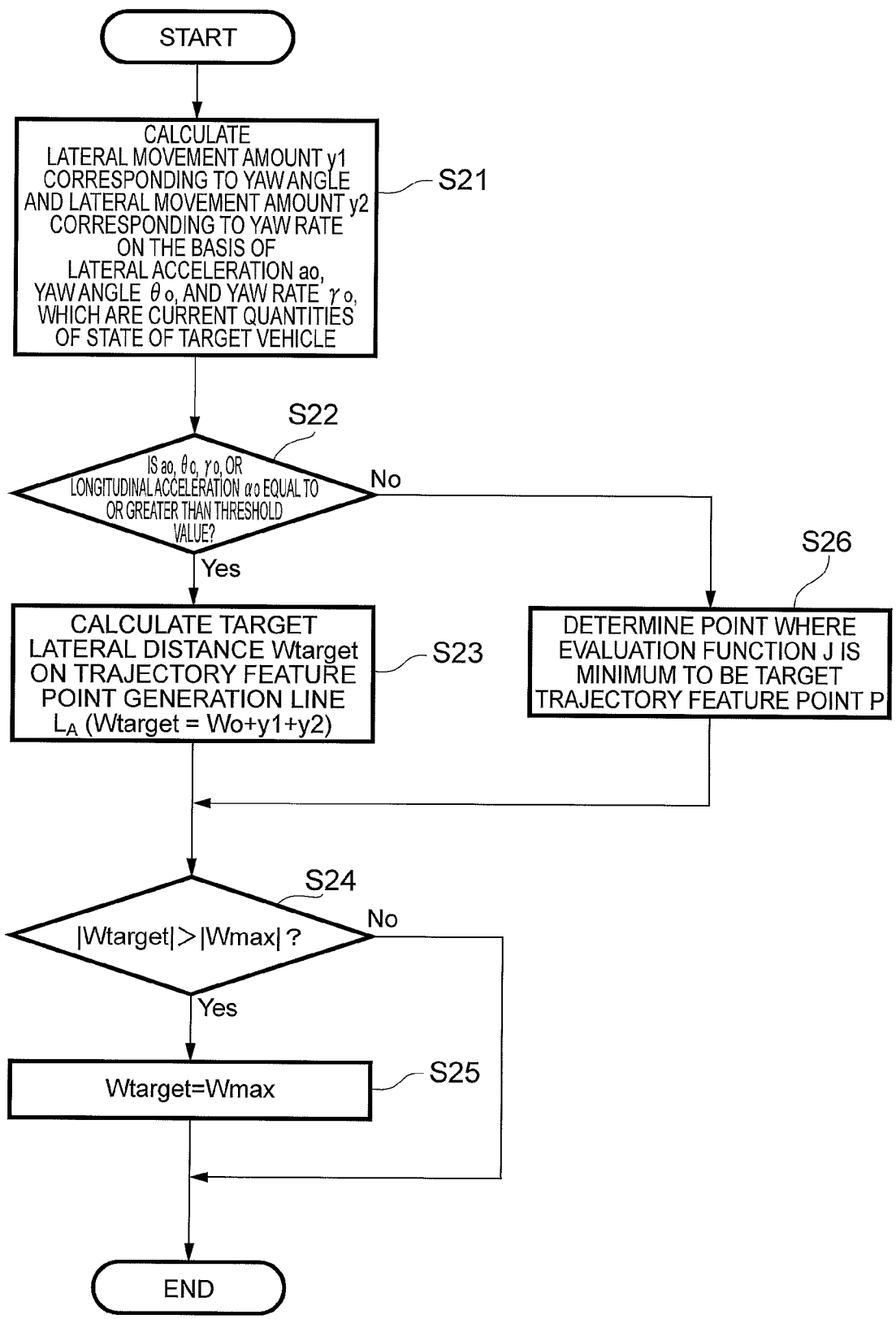
FIG. 6 is a flowchart illustrating a process of calculating the target lateral distance Wtarget in the first embodiment.

Next, a case in which none of ao, θo, γo, and the longitudinal acceleration αo of the host vehicle VM are less than the predetermined threshold value will be described with reference to FIG. 6 (S22). When none of ao, θo, γo, and the longitudinal acceleration αo of the host vehicle VM are less than the predetermined threshold value, it is considered that the driver of the host vehicle VM does not perform a driving operation in order to avoid another vehicle VO. The trajectory feature point generating unit 48 sets, as the trajectory feature point P, a point where a variation in the quantity of state of the host vehicle VM is estimated to be the minimum until the host vehicle reaches the trajectory feature point P from the current state (Vo, Wo) (S26).

Figure 8:
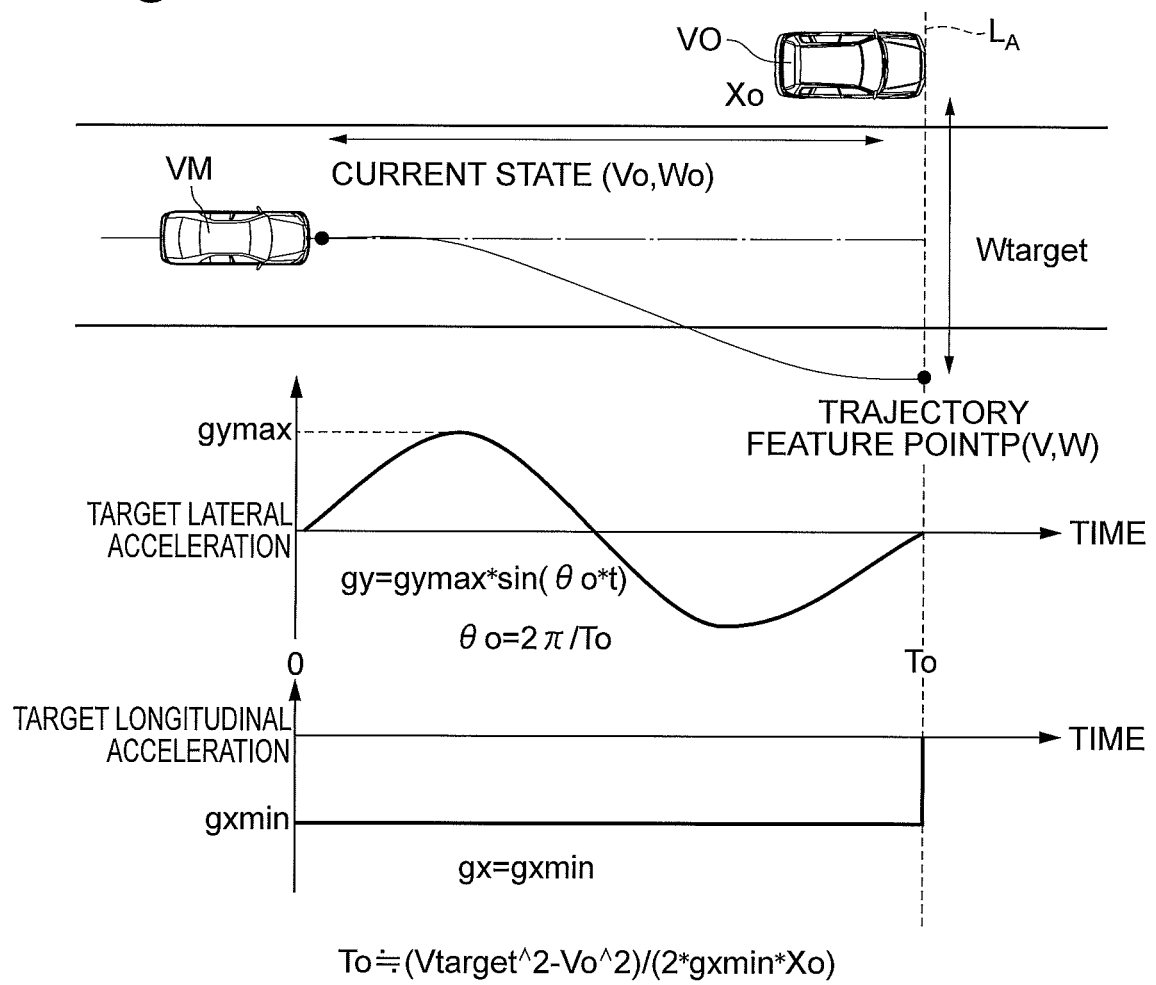
FIG. 8 is a plan view illustrating a method of calculating a target lateral distance Wtarget in a second embodiment.

As shown in FIG. 8, it is assumed that, when the host vehicle VM reaches the trajectory feature point P from the current state (Vo, Wo), target lateral acceleration gy is gymax·sin(θo·t)(θo=2π/To) and target longitudinal acceleration gx is gamin. The arrival time To to the trajectory feature point generation line $L_A$ is appropriately equal to (Vtarget²−Vo²)/(2·gxmin·Xo).

The trajectory feature point generating unit 48 calculates a point where the evaluation function J represented by the following Expression 1 is the minimum in a set P(V, W) of the trajectory feature points P satisfying W<Wmax in the map shown in FIG. 7 using the general optimal regulator problem and sets the point as the target trajectory feature point P (Vtarget, Wtarget) (S26). As such, the method that calculates the target trajectory feature point P when any one of ao, θo, γo, and the longitudinal acceleration αo of the host vehicle VM is less than the predetermined threshold value is also effective in a case in which the host vehicle VM is automatically driven without being driven by the driver.

Evaluation function $J=\int(m \times gx^2 + n \times gy^2)dt$ [Expression 1]

In this embodiment, the trajectory feature point generating unit 48 of the driving support device 10 determines the target speed Vtarget of the host vehicle when the host vehicle passes the vicinity of the obstacle, on the basis of the maximum possible lateral distance Wmax of the host vehicle VM from the obstacle when the host vehicle passes the vicinity of the obstacle and the map in which the lateral distance W and the speed V of the host vehicle when passing through the obstacle are associated with each other. Therefore, for example, the trajectory feature point generating unit 48 can determine the target speed Vtarget of the host vehicle when the host vehicle passes the vicinity of the obstacle such that the speed V is less than a value associated with the predetermined distance W within the range of the maximum possible distance Wmax from the obstacle. Therefore, it is possible to determine a state of the host vehicle VM which is consistent with reality.

In this embodiment, the trajectory feature point generating unit 48 determines the target lateral distance Wtarget when the host vehicle passes the vicinity of the obstacle within the range of the maximum possible lateral distance Wmax of the host vehicle VM from the obstacle when the host vehicle passes the vicinity of the obstacle. In this way, the trajectory feature point generating unit 48 can determine the target lateral distance Wtarget within the range of the maximum possible lateral distance Wmax from the obstacle and determine the target speed Vtarget so as to be equal to or less than the speed associated with the determined target lateral distance Wtarget on the map. Therefore, it is possible to determine a state of the host vehicle VM which is consistent with reality.

In this embodiment, the trajectory feature point generating unit 48 determines the distance between the host vehicle VM and the obstacle when the host vehicle passes the vicinity of the obstacle which is estimated when the current traveling state of the host vehicle VM is maintained to be the target lateral distance Wtarget and determines the speed corresponding to the determined target distance Wtarget on the map in which the lateral distance W and the speed V of the host vehicle VM when passing the vicinity of the obstacle are associated with each other to be the target speed Vtarget. Therefore, the trajectory feature point generating unit 48 can determine the target lateral distance Wtarget when the current traveling state of the host vehicle VM is maintained and intervention in the driving operation of the driver of the host vehicle VM in the lateral direction is minimized and determine the target speed Vtarget corresponding to the target lateral distance Wtarget. Therefore, it is possible to prevent the driver from feeling a sense of incongruity.

According to this embodiment, the trajectory feature point generating unit 48 determines the lateral distance W and the speed V that satisfy the map in which the lateral distance W between the host vehicle VM and the obstacle and the speed V of the host vehicle VM when the host vehicle passes the vicinity of the obstacle are associated with each other and are evaluated to be attained from the current traveling state of the host vehicle VM by a minimum change in the traveling state to be the target lateral distance Wtarget and the target speed Vtarget. Therefore, it is possible to determine the target lateral distance Wtarget and the target speed Vtarget which can be attained by a minimum change in the traveling state. As a result, it is possible to reduce the disturbance of the host vehicle VM when driving support is performed.

Figure 9:
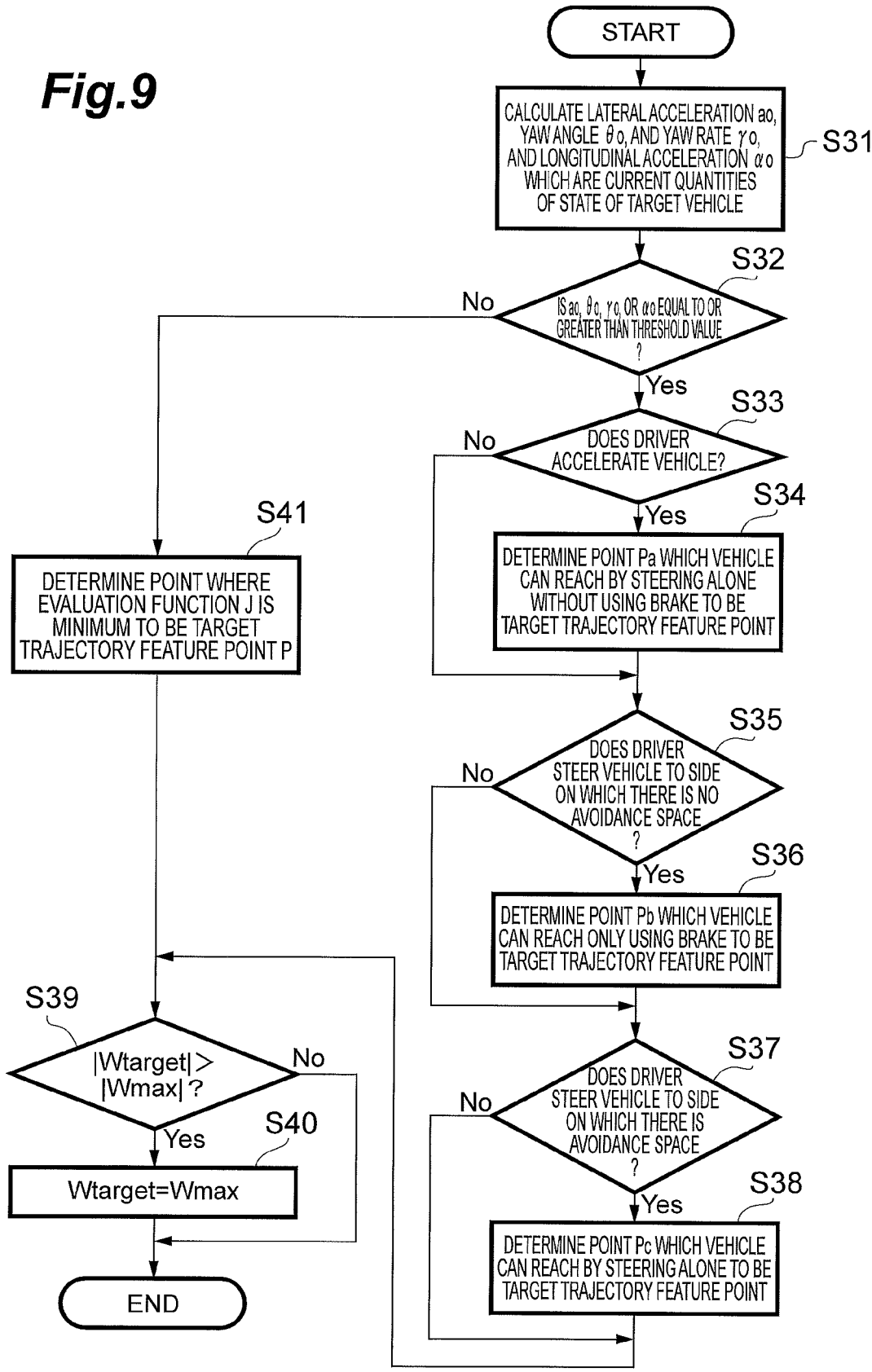
FIG. 9 is a flowchart illustrating a process of calculating a target trajectory feature point P and the target lateral distance Wtarget in the second embodiment.

Next, a second embodiment of the invention will be described. This embodiment is effective in a case in which only the consideration of the estimated position of the host vehicle VM in the future is not sufficient to remove a sense of incongruity of the driver, as in the first embodiment. As shown in FIG. 9, a trajectory feature point generating unit 48 acquires lateral acceleration ao, a yaw angle θo, a yaw rate γo, and longitudinal acceleration αo, which are the current quantities of state of the host vehicle VM (S31). When each of the lateral acceleration ao, the yaw angle θo, the yaw rate γo, and the longitudinal acceleration αo is less than a predetermined threshold value (S32), the trajectory feature point generating unit 48 determines a point where the evaluation function J is the minimum to be a target trajectory feature point (S41).

Figure 10:
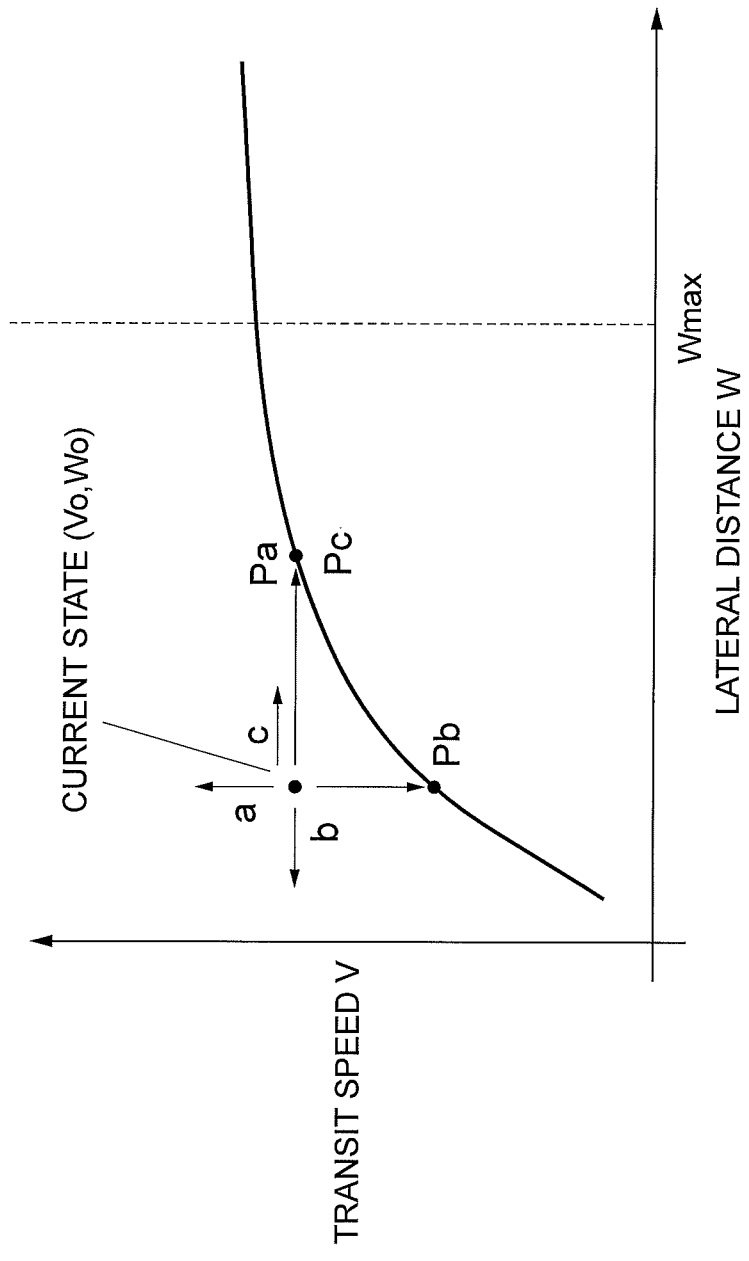
FIG. 10 is a graph illustrating a method of calculating the target trajectory feature point P (Vtarget, Wtarget) in the second embodiment.

When any one of the lateral acceleration ao, the yaw angle θo, the yaw rate γo, and the longitudinal acceleration αo is equal to or greater than the predetermined threshold value (S32) and the driver accelerates the host vehicle VM (S33), the trajectory feature point generating unit 48 determines a point Pa which the host vehicle can reach by steering only, without using the brake to be a target trajectory feature point P, as shown in FIGS. 9 and 10 (S34).

When the driver steers the vehicle to a side on which there is no avoidance space (a side close to another vehicle VO) (S35), the trajectory feature point generating unit 48 determines a point Pb which the host vehicle can reach only using the brake to be the target trajectory feature point P (S36).

When the driver steers the vehicle to the side on which there is an avoidance space (the side away from another vehicle VO) (S37), the trajectory feature point generating unit 48 determines a point Pc which the host vehicle can reach by steering only to be the target trajectory feature point P (S38).

When |Wtarget|>|Wmax| is satisfied (S39), the trajectory feature point generating unit 48 sets the target lateral distance Wtarget to be equal to Wmax, as shown in FIG. 2 (S40). When |Wtarget|>|Wmax| is not satisfied (S39), the trajectory feature point generating unit 48 sets the target lateral distance Wtarget calculated by the above-mentioned method, as shown in FIG. 10.

According to this embodiment, when the host vehicle VM is accelerated, the trajectory feature point generating unit 48 determines a lateral distance W and a speed V that satisfy the map in which the lateral distance W between the host vehicle VM and an obstacle and the speed V of the host vehicle VM when the host vehicle passes the vicinity of the obstacle are associated with each other and can be attained by steering only to be the target lateral distance Wtarget and the target speed Vtarget, respectively. When the host vehicle VM is steered such that the distance from the obstacle is reduced, the trajectory feature point generating unit 48 determines the lateral distance W and the speed V that satisfy the map of the lateral distance W and the speed V and can be attained by braking only to be the target lateral distance Wtarget and the target speed Vtarget, respectively. When the host vehicle VM is steered such that the distance from the obstacle increases, the trajectory feature point generating unit 48 determines the lateral distance W and the speed V that satisfy the map of the lateral distance W and the speed V and can be attained by steering only to be the target lateral distance Wtarget and the target speed Vtarget, respectively. Therefore, it is possible to determine the target lateral distance Wtarget and the target speed Vtarget with a simple process while reducing intervention in the driving operation of the driver. As a result, it is possible to prevent the driver from feeling a sense of incongruity with a simple process.

Figure 11:
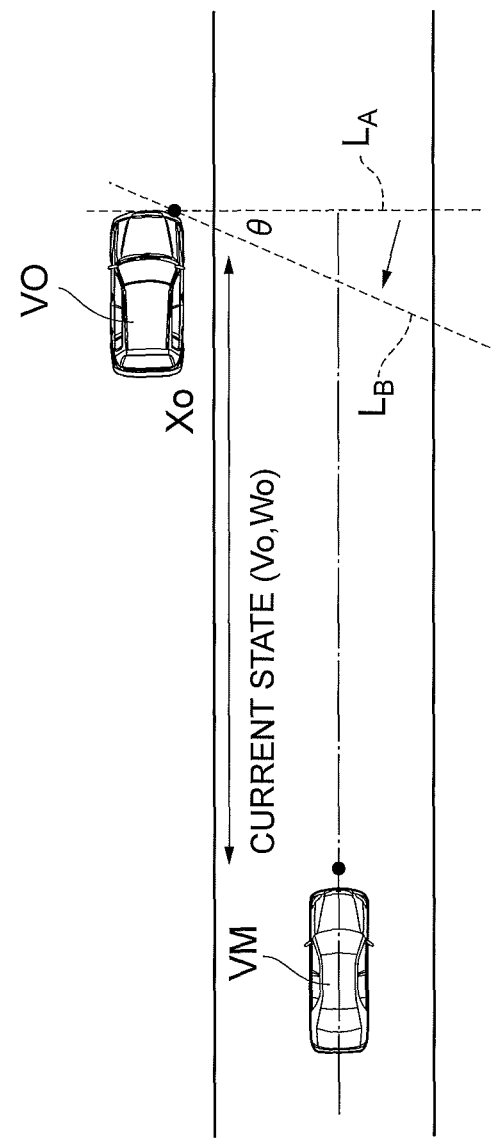
FIG. 11 is a plan view illustrating a situation in which the host vehicle passes through a reference line extending from the side of the vehicle in front in a third embodiment.

Next, a third embodiment of the invention will be described. In this embodiment, a method of setting the trajectory feature point generation line is changed, as compared to the first and second embodiments. As shown in FIG. 11, in this embodiment, a trajectory feature point generation line setting unit 47 sets a trajectory feature point generation line $L_B$ which is included by θ in the direction of a host vehicle VM from a trajectory feature point generation line $L_A$ which extends from the leading end of another vehicle VO in a direction perpendicular to the lane of the road. That is, the trajectory feature point generation line $L_B$ is set such that a reference line passes through a point which is closer to the current position of the host vehicle VM as the distance from an obstacle increases.

In the above-described embodiment, the trajectory feature point generation line $L_A$ for ending driving support is constant, regardless of the blind spot by the obstacle or the lateral distance W from the pedestrian. This is not appropriate for a sense of the driver who makes a snap decision to stop visual observation, stop deceleration, and start acceleration when a certain degree of visibility of the blind spot is ensured. As a result, the driver is likely to feel a sense of incongruity for driving support or the operation of the driver is likely to interfere with driving support.

In contrast, in this embodiment, the trajectory feature point generation line setting unit 47 sets the trajectory feature point generation line $L_B$ set in the vicinity of the obstacle so as to pass through a point closer to the current position of the host vehicle VM as the distance from the obstacle increases. Therefore, as the distance from the obstacle increases and it is easier to ensure visibility of the blind spot caused by the obstacle, the target distance and the target speed are determined earlier at a point which is closer to the current position of the host vehicle, and driving support ends, which makes it possible to determine a state of the host vehicle which is consistent with reality and the senses of the driver. As a result, it is possible to prevent the interference between driving support and the operation of the driver.

The embodiments of the invention have been described above, but the invention is not limited to the above-described embodiments. Various modifications of the invention can be made.

INDUSTRIAL APPLICABILITY

According to the driving support device, the driving support method, and the driving support program of the invention, it is possible to determine a state of the host vehicle which is consistent with reality.

REFERENCE SIGNS LIST

10: DRIVING SUPPORT DEVICE
12: LASER RADAR
14: MOTION SENSOR
18: CAMERA
20: GPS
22: COMPUTER
38: MAP DB
40: ENVIRONMENTAL MOTION DETECTING UNIT
46: MOVEMENT RULE STORAGE UNIT
47: TRAJECTORY FEATURE POINT GENERATION LINE SETTING UNIT
48: TRAJECTORY FEATURE POINT GENERATING UNIT
50: TRAJECTORY GENERATING UNIT
52: TRAJECTORY DIFFERENCE DETECTING UNIT
54: DRIVING SUPPORT UNIT

The invention claimed is:

1. A driving support device comprising:
a target determining unit that determines a target speed of a host vehicle when the host vehicle passes the vicinity of an obstacle, on the basis of a maximum possible lateral distance of the host vehicle from the obstacle when the host vehicle passes the vicinity of the obstacle and including a map associating the maximum possible lateral distance of the host vehicle from the obstacle and a speed of the host vehicle at the time when the host vehicle passes the vicinity of the obstacle.

2. The driving support device according to claim 1, wherein the target determining unit determines a target distance between the host vehicle and the obstacle when the host vehicle passes the vicinity of the obstacle, in the range of the maximum possible lateral distance of the host vehicle from the obstacle when the host vehicle passes the vicinity of the obstacle.

3. The driving support device according to claim 1, wherein the target determining unit determines the distance between the host vehicle and the obstacle when the host vehicle passes the vicinity of the obstacle, which is estimated on the basis of the current traveling state of the host vehicle, to be the target distance, and
the target determining unit determines a speed equal to or less than the speed corresponding to the determined target distance to be the target speed in the map.

4. The driving support device according to claim 1, wherein the target determining unit determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and are evaluated to be attained from the current traveling state of the host vehicle by a minimum change in the traveling state, to be the target distance and the target speed.

5. The driving support device according to claim 1, wherein, when the host vehicle is accelerated, the target determining unit determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed,
when the host vehicle is steered such that the distance from the obstacle is reduced, the target determining unit determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by braking only, to be the target distance and the target speed, and
when the host vehicle is steered such that the distance from the obstacle increases, the target determining unit determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed.

6. The driving support device according to claim 1, wherein the target determining unit determines the target distance between the host vehicle and the obstacle and the target speed of the host vehicle when the host vehicle passes through a reference line which is set in the vicinity of the obstacle, and
the reference line is set so as to pass through a point that is closer to the current position of the host vehicle as the distance from the obstacle increases.

7. A driving support device comprising:
a storage unit that stores a relationship between a distance between a host vehicle and an obstacle and a speed of the host vehicle when the host vehicle passes the vicinity of the obstacle;
a maximum distance calculating unit that calculates a maximum possible lateral distance of the host vehicle from the obstacle when the host vehicle passes the vicinity of the obstacle; and
a target determining unit that determines a target speed of the host vehicle when the host vehicle passes the vicinity of the obstacle, on the basis of the relationship stored in the storage unit and the maximum possible lateral distance calculated by the maximum distance calculating unit.

8. A driving support method comprising:
a target determining step of determining a target speed of a host vehicle when the host vehicle passes the vicinity of an obstacle, on the basis of a maximum possible lateral distance of the host vehicle from the obstacle when the host vehicle passes the vicinity of the obstacle and including a map associating the maximum possible lateral distance of the host vehicle from the obstacle and a speed of the host vehicle at the time when the host vehicle passes the vicinity of the obstacle.

9. The driving support method according to claim 8,
wherein the target determining step determines a target distance between the host vehicle and the obstacle when the host vehicle passes the vicinity of the obstacle, in the range of the maximum possible lateral distance of the host vehicle from the obstacle when the host vehicle passes the vicinity of the obstacle.

10. The driving support method according to claim 8,
wherein the target determining step determines the distance between the host vehicle and the obstacle when the host vehicle passes the vicinity of the obstacle, which is estimated on the basis of the current traveling state of the host vehicle, to be the target distance, and
the target determining step determines a speed equal to or less than the speed corresponding to the determined target distance to be the target speed in the map.

11. The driving support method according to claim 8,
wherein the target determining step determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and are evaluated to be attained from the current traveling state of the host vehicle by a minimum change in the traveling state, to be the target distance and the target speed.

12. The driving support method according to claim 8,
wherein, when the host vehicle is accelerated, the target determining step determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed,
when the host vehicle is steered such that the distance from the obstacle is reduced, the target determining step determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by braking only, to be the target distance and the target speed, and
when the host vehicle is steered such that the distance from the obstacle increases, the target determining step determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed.

13. The driving support method according to claim 8,
wherein the target determining step determines the target distance between the host vehicle and the obstacle and the target speed of the host vehicle when the host vehicle passes through a reference line which is set in the vicinity of the obstacle, and
the reference line is set so as to pass through a point that is closer to the current position of the host vehicle as the distance from the obstacle increases.

14. A driving support program that allows an electronic computer to perform:
a target determining step of determining a target speed of a host vehicle when the host vehicle passes the vicinity of an obstacle, on the basis of a maximum possible lateral distance of the host vehicle from the obstacle when the host vehicle passes the vicinity of the obstacle and including a map associating the maximum possible lateral distance of the host vehicle from the obstacle and a speed of the host vehicle at the time when the host vehicle passes the vicinity of the obstacle.

15. The driving support program according to claim 14,
wherein the target determining step determines a target distance between the host vehicle and the obstacle when the host vehicle passes the vicinity of the obstacle, in the range of the maximum possible lateral distance of the host vehicle from the obstacle when the host vehicle passes the vicinity of the obstacle.

16. The driving support program according to claim 1,
wherein the target determining step determines the distance between the host vehicle and the obstacle when the host vehicle passes the vicinity of the obstacle, which is estimated on the basis of the current traveling state of the host vehicle, to be the target distance, and
the target determining step determines a speed equal to or less than the speed corresponding to the determined target distance to be the target speed in the map.

17. The driving support program according to claim 1,
wherein the target determining step determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and are evaluated to be attained from the current traveling state of the host vehicle by a minimum change in the traveling state, to be the target distance and the target speed.

18. The driving support program according to claim 1,
wherein, when the host vehicle is accelerated, the target determining step determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed,
when the host vehicle is steered such that the distance from the obstacle is reduced, the target determining step determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by braking only, to be the target distance and the target speed, and
when the host vehicle is steered such that the distance from the obstacle increases, the target determining step determines the distance between the host vehicle and the obstacle and the speed of the host vehicle, which satisfy the correspondence relationship between the distance between the host vehicle and the obstacle and the speed of the host vehicle when the host vehicle passes the vicinity of the obstacle and can be attained by steering only, to be the target distance and the target speed.

19. The driving support program according to claim 14, wherein the target determining step determines the target distance between the host vehicle and the obstacle and the target speed of the host vehicle when the host vehicle passes through a reference line which is set in the vicinity of the obstacle, and the reference line is set so as to pass through a point that is closer to the current position of the host vehicle as the distance from the obstacle increases.

\* \* \* \* \*